US012332789B2

United States Patent
Ajila et al.

(10) Patent No.: US 12,332,789 B2
(45) Date of Patent: Jun. 17, 2025

(54) MULTIPLE LEVEL CACHING OF USER LEVEL THREAD STACKS FOR USER LEVEL THREADS

(71) Applicant: International Business Machines Corporation, Armonk, NY (US)

(72) Inventors: Oluwatobi Ajila, Ottawa (CA); Babneet Singh, Nepean (CA); Siwei Lu, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/489,501

(22) Filed: Oct. 18, 2023

(65) Prior Publication Data
US 2025/0130942 A1  Apr. 24, 2025

(51) Int. Cl.
*G06F 12/0811* (2016.01)

(52) U.S. Cl.
CPC ................ *G06F 12/0811* (2013.01)

(58) Field of Classification Search
CPC .................................................. G06F 12/0811
See application file for complete search history.

(56) References Cited

U.S. PATENT DOCUMENTS

| | | | |
|---|---|---|---|
| 7,805,573 B1 * | 9/2010 | Coon | G06F 12/0842 712/228 |
| 10,229,075 B2 | 3/2019 | Arndt et al. | |
| 10,303,523 B2 | 5/2019 | Misra et al. | |
| 10,382,343 B2 | 8/2019 | Waskiewicz, Jr. et al. | |
| 10,402,197 B2 | 9/2019 | Cannata | |
| 11,373,203 B2 | 6/2022 | Shah et al. | |
| 11,481,307 B2 | 10/2022 | Otsuki et al. | |
| 2005/0027761 A1 * | 2/2005 | Wu | G06F 12/0261 |
| 2016/0246742 A1 * | 8/2016 | Kimmel | G06F 13/102 |
| 2019/0188239 A1 * | 6/2019 | Serrano | G06F 9/3851 |
| 2020/0210342 A1 | 7/2020 | Zeng et al. | |
| 2021/0035721 A1 | 2/2021 | Ngo et al. | |
| 2021/0097000 A1 * | 4/2021 | Dutta | G06F 12/0815 |
| 2021/0286628 A1 | 9/2021 | Klee et al. | |
| 2021/0357214 A1 | 11/2021 | Mishaeli et al. | |
| 2021/0389985 A1 | 12/2021 | Chen | |

(Continued)

OTHER PUBLICATIONS

Chen, et al., "TVM: An Automated End-to-End Optimizing Compiler for Deep Learning", Feb. 12, 2018, Cornell University, arXivLabs, accessed Oct. 9, 2023, https://arxiv.org/abs/1802.04799.

(Continued)

*Primary Examiner* — Prasith Thammavong
(74) *Attorney, Agent, or Firm* — Yee & Associates, P.C.

(57) ABSTRACT

Multiple level stack caching is provided. A user level thread of a multithreaded application is unmounted from a carrier thread of an operating system. An analysis of a level 1 cache corresponding to the carrier thread in memory is performed to determine whether the level 1 cache is full. An analysis of a level 2 cache in memory is performed to determine whether the level 2 cache is full in response to determining that the level 1 cache corresponding to the carrier thread in memory is full. A user level thread stack corresponding to the user level thread is stored in the level 2 cache in memory in response to determining that the level 2 cache in memory is not full.

20 Claims, 6 Drawing Sheets

(56) References Cited

U.S. PATENT DOCUMENTS

2022/0291962 A1  9/2022  Cherches et al.
2023/0185601 A1  6/2023  Inoue

OTHER PUBLICATIONS

Feng, et al., "TriCache: A User-Transparent Block Cache Enabling High-Performance Out-of-Core Processing with In-Memory Programs," 16th USENIX Symposium on Operating Systems Design and Implementation, Jul. 11-13, 2022, pp. 395-411, USENIX Association, accessed Oct. 9, 2023, https://www.usenix.org/conference/osdi22/presentation/feng.

Iwasaki, et al., "Analyzing the Performance Trade-Off in Implementing User-Level Threads," IEEE Transactions on Parallel and Distributed Systems, Aug. 1, 2020, pp. 1859-1877, vol. 31, IEEE, accessed Oct. 9, 2023, doi: 10.1109/TPDS.2020.2976057.

Ma, et al., "Bringing Segmented Stacks to Embedded Systems," HotMobile '23: Proceedings of the 24th International Workshop on Mobile Computing Systems and Applications, Feb. 22, 2023, pp. 117-123, ACM Digital Library, accessed Oct. 9, 2023, https://doi.org/10.1145/3572864.3580344.

Pari, et al., "A Multi-Tier Stacked Ensemble Algorithm to Reduce the Regret of Incremental Learning for Streaming Data," IEEE Access, Aug. 31, 2018, pp. 48726-48739, vol. 6, IEEE, accessed Oct. 9, 2023, https://ieeexplore.ieee.org/document/8452944.

Pressler, "State of Loom," May 2020, 10 pages, Oracle Corporation, accessed Oct. 12, 2023, https://cr.openjdk.org/~rpressler/loom/loom/sol1_part1.html.

Pressler, et al., "JEP 425: Virtual Threads (Preview)," OpenJDK, Jun. 7, 2023, 18 pages, Oracle Corporation, accessed Oct. 12, 2023, https://openjdk.org/jeps/425.

* cited by examiner

MULTIPLE LEVEL CACHING OF USER LEVEL THREAD STACKS FOR USER LEVEL THREADS

BACKGROUND

The disclosure relates generally to multithreaded applications and more specifically to storing stacks for threads.

Multithreading is the ability of a processor or a single core in a multi-core processor to provide multiple threads of execution concurrently, supported by the operating system. A thread is the path taken, the steps performed, and the order in which a running application performs the steps. A thread runs code from its starting location in an ordered, predefined sequence for a given set of inputs.

A multithreaded application uses more than one thread to accomplish its tasks. Threads are a way to achieve concurrent execution within a single process. The threads share the process' resources, but can be executed independently. The use of multiple threads allows the multithreaded application to distribute tasks so that the tasks can be executed in parallel. This helps improve performance and responsiveness, especially on multiprocessor systems. For example, a word processing application can have different threads responsible for various tasks, such as, for example, responding to user inputs, checking spelling and grammar, saving backups, and the like. By using the different threads, the word processing application can perform these various tasks concurrently, allowing the user interface to remain responsive even during lengthy tasks.

SUMMARY

According to one illustrative embodiment, a computer-implemented method for multiple level stack caching is provided. A computer unmounts a user level thread of a multithreaded application from a carrier thread of an operating system. The computer performs an analysis of a level 1 cache corresponding to the carrier thread in memory to determine whether the level 1 cache is full. The computer performs an analysis of a level 2 cache in memory to determine whether the level 2 cache is full in response to the computer determining that the level 1 cache corresponding to the carrier thread in memory is full. The computer stores a user level thread stack corresponding to the user level thread in the level 2 cache in memory in response to the computer determining that the level 2 cache in memory is not full. According to other illustrative embodiments, a computer system and computer program product for multiple level stack caching are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
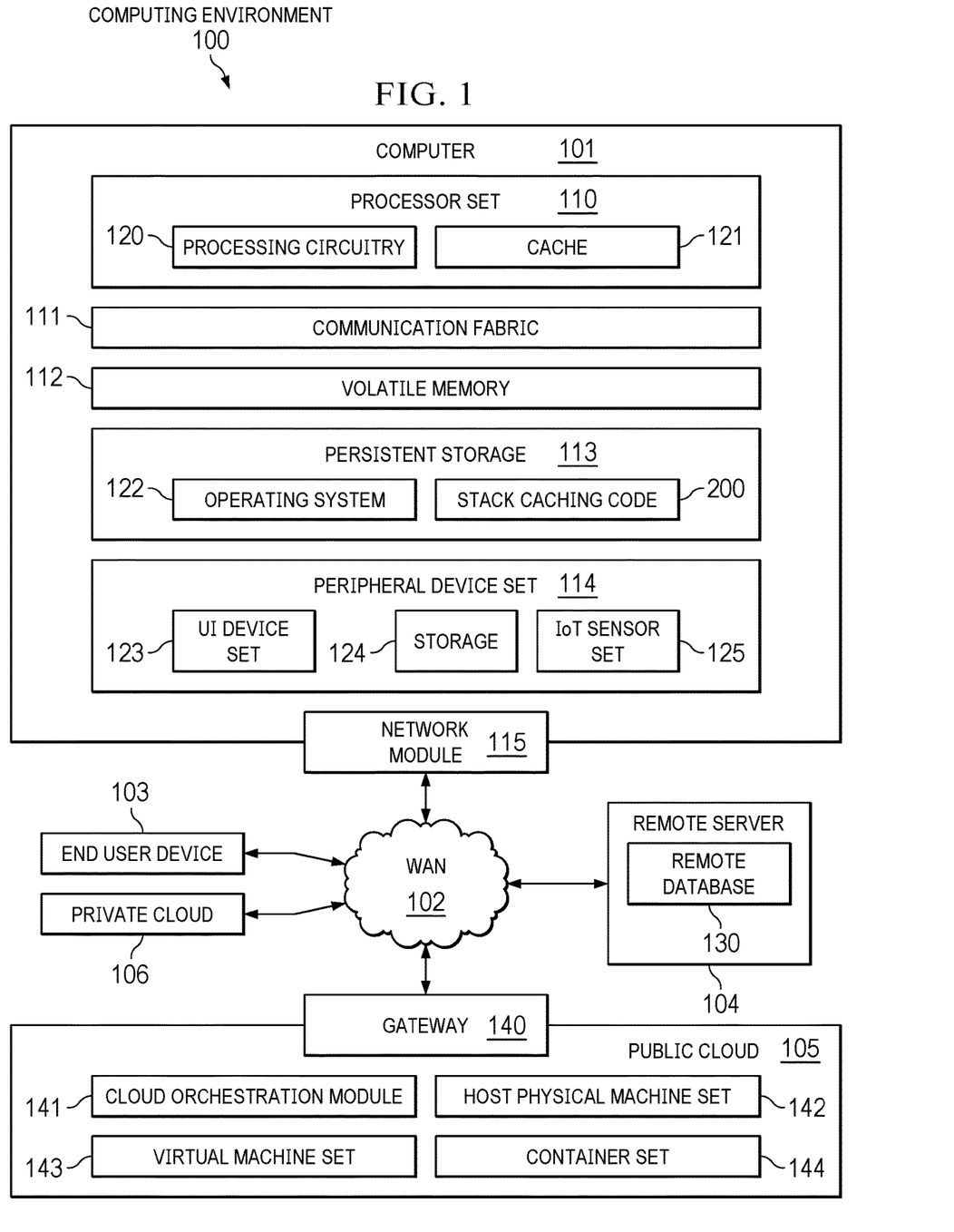
FIG. 1 is a pictorial representation of a computing environment in which illustrative embodiments may be implemented.
Figure 2:
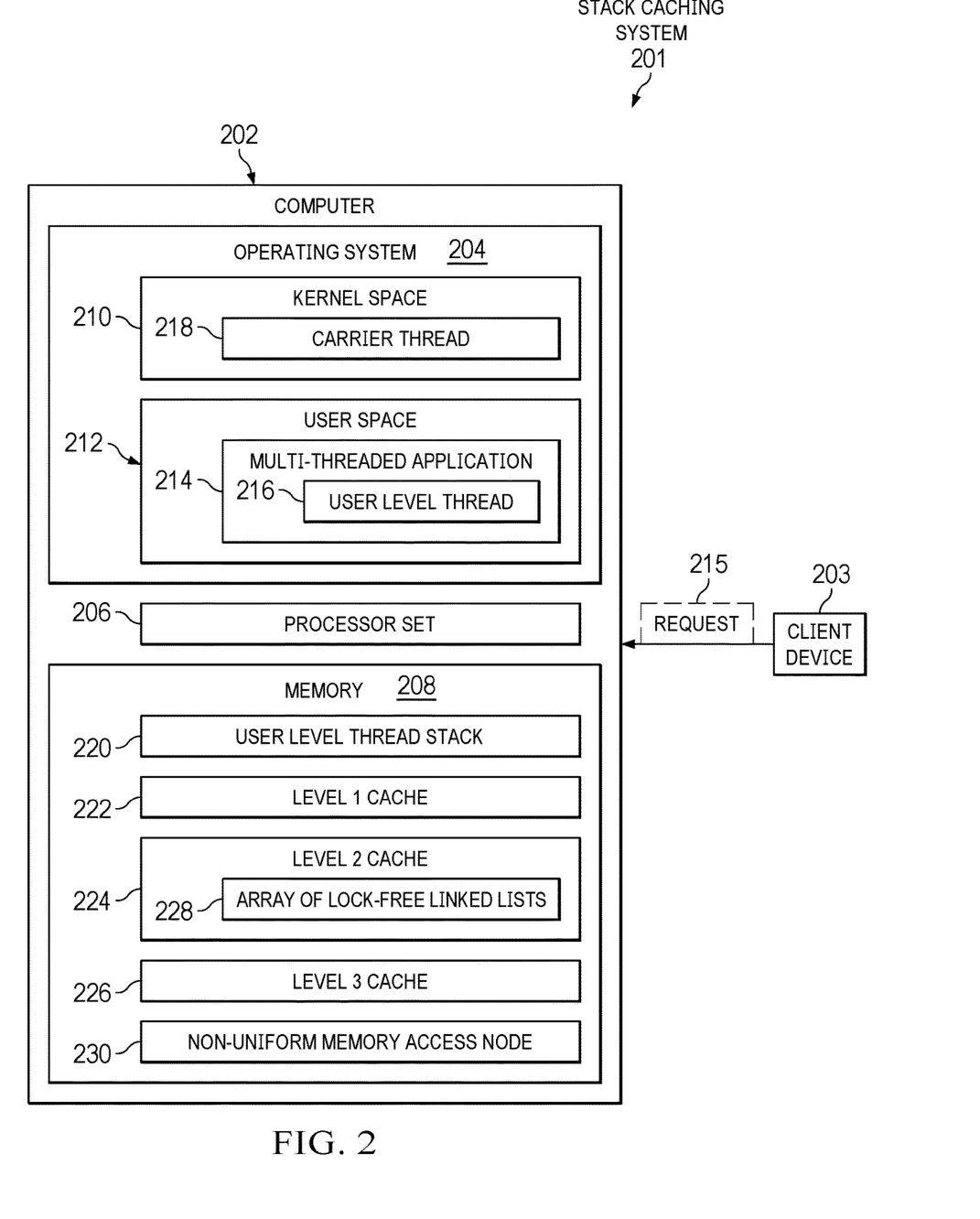
FIG. 2 is a diagram illustrating an example of a stack caching system in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as stack caching code 200. For example, stack caching code 200 performs a user level thread stack caching process that improves performance of user level threads (e.g., virtual threads) by minimizing the cost of generating new user level thread stacks for the user level threads during runtime using multiple cache levels (e.g., level 1 cache, level 2 cache, and level 3 cache) to store the user level thread stacks corresponding to the user level threads. Thus, stack caching code 200 minimizes allocations and deallocations of user level thread stacks, minimizes contention between user level threads, and minimizes initialization overhead of new user level thread stacks using the multiple cache levels. These minimizations provide significant performance improvement for the user level threads, especially when dealing with a large number of user level threads (e.g., 10,000 or more user level threads).

A user level thread needs a user level thread stack of its own to keep track of and store its execution state. A user level thread needs a carrier thread to perform processor work. Stack caching code 200 assigns a user level thread to a carrier thread in a process called mounting and unassigns the user level thread from the carrier thread in a process called unmounting. A platform thread running a user level thread is called a carrier thread. A platform thread is a thin wrapper around an operating system kernel thread.

In addition to stack caching code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and stack caching code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, smart phone, smart watch or other wearable computer, or any other form of computer or mobile device now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in stack caching code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a customer of an entity that operates computer 101), and may take any of the forms discussed above in connection with computer 101. EUD 103 typically receives helpful and useful data from the operations of computer 101. For example, in a hypothetical case where computer 101 is designed to provide a service to the end user, this service would typically be provided via network module 115 of computer 101 through WAN 102 to EUD 103. In this way, EUD 103 can display, or otherwise present, the service to the end user. In some embodiments, EUD 103 may be a client device, such as thin client, heavy client, mainframe computer, desktop computer, laptop computer, tablet computer, smart phone, smart watch, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a service to customers based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

A multithreaded application, such as, for example, a Java® multithreaded application, has a 1 to 1 mapping of its threads with operating system kernel threads or platform threads. Java is a registered trademark of Oracle America, Inc., Redwood Shores, California, USA. However, operating system kernel threads are expensive, consume lots of time and resources to allocate, and the operating system kernel can only reasonably support thousands of kernel threads. As a result, asynchronous programming patterns have become the norm. These asynchronous programming patterns are difficult to reason and debug. User level threads do not necessarily need everything that kernel threads support because user level threads do not have much execution context to keep track of. In other words, user level threads are lightweight threads. User level threads run on carrier threads, which have a 1 to 1 relationship with operating system kernel threads or platform threads.

By default, a global scheduler schedules user level threads with as many virtual machines as there are processor cores. Therefore, the global scheduler schedules a large number of user level threads on a small number of carrier threads. This is known as M:N scheduling (i.e., M number of user level threads are scheduled onto N number of carrier threads, where M>>N). User level threads are executed by first mounting the user level threads onto carrier threads. This can be thought of as scheduling a user level thread. When the user level thread completes, the user level thread is unmounted (i.e., de-scheduled) from the carrier thread.

The underlying mechanism for context switching in user level threads is pausing and resuming thread state, which requires capturing the thread stack and live variables (e.g., program counter, frame pointer, live arguments, and the like). Different virtual machine implementations handle thread stacks differently. For example, one approach is to execute code on the native stack. Another approach is to allocate a separate (i.e., user level thread) stack to execute the code. The first approach is easier for third party tools to walk thread stack frames (e.g., when the virtual machine also uses a platform thread calling convention) if code executes on the native thread stack. The second approach does not need to allocate the entire thread stack upfront, but can grow the thread stack as more space is needed.

A common approach for implementing context switching on a user level thread is by performing a user level thread stack copy (e.g., the user level thread stack copy is needed when code is run on a native thread stack), where the user level thread stack of the user level thread is copied into a buffer allowing the state of another user level thread to be copied into the thread stack memory. This common approach for implementing context switching on a user level thread also requires that the unmounted user level thread stack be walkable (e.g., reachable) in order for the garbage collector to find a live user level thread stack. This can be performed by copying all references into a user level thread stack array, while supplying a mapping back to the original user level thread stack layout. Alternatively, this can simply be a bulk copy of the entire user level thread stack, maintaining the same user level thread stack layout so that the user level thread stack remains walkable.

In virtual machines where code is executed on a user level thread stack, another option exists for context switching on the user level tread (i.e., user level thread stack switching). Using this user level thread stack switching approach, context switching on the user level thread simply involves switching from one user level thread stack to another corresponding user level thread stack. All that is needed is to swap the virtual machine live register values.

Stack switching is an approach when dealing with user level threads that have a large stack size. However, an issue with stack switching is that a thread stack needs to be allocated for every user level thread, which then needs to be subsequently freed when the user level thread completes. This overhead can be very high in high contention cases. When user level thread stacks have a small stack size, this can lead to worse performance than thread stack copying.

This issue is compounded when thread stacks need to be allocated in a limited memory address space for stack allocation. This often involves using a sub-allocator that is bound to the limited memory address space. In this case, the cost contention can be prohibitive, especially when using a large number of carrier threads and user level threads.

Illustrative embodiments utilize multiple level caching of user level thread stacks to, for example: 1) minimize duration of searches to allocate and free user level thread stacks; 2) minimize contention when assigning a user level thread stack to a user level thread; 3) minimize overhead of initializing a user level thread stack in a given memory space; and 4) minimize frequency of global lock operations to allocate and free user level thread stacks. The multiple levels of caching provided by illustrative embodiments include a level 1 cache, a level 2 cache, and a level 3 cache, which are located in physical memory.

The level 1 cache is an uncontended thread local/specific stack cache that can be dynamically sized. The level 2 cache is a contended, non-blocking shared cache that can be dynamically sized as well. The level 2 cache utilizes a compare-and-swap operation for lock-free synchronization. Optionally, illustrative embodiments can generate a level 2 cache per Non-Uniform Memory Access (NUMA) node located in the physical memory to limit internode traffic with compare-and-swap (CAS) operations. NUMA refers to a multiprocessor system whose memory is divided into multiple memory nodes. CAS is a technique in lock-free algorithms to ensure that updates to shared memory by one thread fail if another thread has modified the same memory space in the meantime. The level 3 cache is a contended, blocking cache. Illustrative embodiments utilize a synchronization structure, such as, for example, a mutex, to guard access to the level 3 cache. It should be noted that the level 3 cache is optional. For example, the level 3 cache may be beneficial in cases where there is minimal memory pressure and illustrative embodiments want to later redistribute the user level thread stacks from the level 3 cache to the level 1 cache and the level 2 cache under a single locking operation.

Thus, illustrative embodiments avoid the cost of generating a user level thread stack in most cases. Also, in most cases, there is no contention in acquiring a user level thread stack, and when there is contention, illustrative embodiments limit the contention. Furthermore, reusing a user level thread stack for a corresponding user level thread has the additional benefit of not having to resize the user level thread stack. Typically, usage of a user level thread involves running the same code many times, which means that the user level thread stack size needed for the first run of the user level thread will likely be sufficient for subsequent runs of the user level thread.

In contrast to simple user level thread stack caching (e.g., a level 1 cache only), illustrative embodiments utilize the multiple cache levels to manage imbalanced workloads. An example of an imbalanced workload is when a small number of carrier threads exhaust their local thread stack cache by mounting a majority of user level threads. This type of imbalanced workload can occur naturally in I/O bound multithreaded applications as variability exists regarding runtime of any user level thread assigned to a carrier thread. The presence of a shared cache (e.g., the level 2 cache of illustrative embodiments) in a multiple level cache architecture helps with reclaiming and redistributing cached user level thread stacks with other carrier threads that were unable to obtain their user level thread stack allocation from their corresponding level 1 thread stack cache. During steady state, when user level thread stacks are generated and consumed at the same rate on each carrier thread, there is no need to access the level 2 cache when the level 1 cache is adequately sized to compensate for temporal rate changes.

One current solution allocates a user level thread stack each time. However, this current solution increases overhead by initializing a user level thread stack each time. Another current solution utilizes a thread stack local allocator or sub-allocator. However, this current solution also needs to allocate and initialize a user level thread stack each time.

Illustrative embodiments provide each respective carrier thread with a free-list of user level thread stacks in that particular carrier thread's corresponding level 1 cache. Initially, this free-list of user level thread stacks is empty. When a user level thread mounted on a particular carrier thread completes, illustrative embodiments add the user level thread stack corresponding to the user level thread mounted on that particular carrier thread to the free-list of user level thread stacks in the level 1 cache corresponding to that particular carrier thread. The size of the free-list of user level thread stacks in the level 1 cache is configurable. The default size of the free-list is 1. The size of the free-list (i.e., level 1 cache) can change during the lifetime of the carrier thread running on the virtual machine.

Let X be the rate of stack allocations from the level 1 cache. Let Y be the rate of stack releases from the level 1 cache. Let Z be the size of the level one cache. Let U be the variance in the rate of stack allocations and releases. When U approaches zero and X is equivalent to Y, then Z can be held constant and set to X, which is the same as Y in this case. This is an example of a scenario where there is no net increase in demand for user level stacks. In this case, level 1 caching is useful. When X is the same as Y, but U is high, then Z must be larger the X but can still be held constant. In this case, level 1 caching is useful. If $X>>Y$, then Z must gradually increase in size over time. This is a case where the net demand in user level thread stacks is always increasing. In this case, level 1 caching is not as useful. If $X<<Y$, then Z must gradually decrease over time. This is a case where the net demand in user level thread stacks is reducing and may eventually become zero. In this case, user level thread stacks are not as useful.

The level 2 cache includes an array of user level thread stacks. Initially, the array of user level thread stacks in the level 2 cache is empty. When a user level thread completes, and illustrative embodiments cannot add the user level thread stack corresponding to that user level thread to the corresponding carrier thread's free-list of user level thread stacks in the level 1 cache because the level 1 cache is full, illustrative embodiments add that user level thread stack to the array of user level thread stacks in the level 2 cache. The array of user level thread stacks in the level 2 cache can be either: 1) accessed by all carrier threads; or 2) accessed by carrier threads corresponding to a particular NUMA node in the physical memory (i.e., one level 2 cache is located in each respective NUMA node of memory). The size of this array of user level thread stacks in the level 2 cache is configurable. The default maximum size of the array is: 1) the number of carrier threads; or 2) the number of hardware threads (e.g., number of physical processors or processor cores) corresponding to the NUMA node (i.e., when illustrative embodiments use the level 2 cache in a NUMA node-aware configuration). This implementation is preferable when the array is relatively small (e.g., a relatively small number of carrier threads or a relatively small level 2 cache). Due to a greedy search, the array-based implementation leads to a non-marginal number of searches as the size of the level 2 cache increases. For a relatively large array (e.g., a relatively large number of carrier threads or a relatively large level 2 cache), illustrative embodiments implement the level 2 cache as an array of lock-free linked lists or queues (e.g., used as pools) of user level thread stacks. The size of the array of a user level thread stack in the level 2 cache can be less than or equal to the number of carrier threads. The array of lock-free linked lists or queues decreases search times in comparison to current solutions where only a single global array is used to store the user level thread stacks. This array of lock-free linked lists or queues also helps with temporal imbalances, which includes allocating from an almost free cache, releasing to a mostly full cache, and the like. Illustrative embodiments can resize the level 2 cache utilizing similar heuristics for the level 1 cache above.

The level 3 cache includes a list of user level thread stacks. This list of user level thread stacks in the level 3 cache is initially empty. However, when a user level thread completes, and illustrative embodiments cannot add the corresponding user level thread stack to the level 1 cache or the level 2 cache because both the level 1 cache and the level 2 cache are full, illustrative embodiments add that user level thread stack to the list of user level thread stacks in the level 3 cache. The list of user level thread stacks in the level 3 cache is accessible to all carrier threads. The size of the list of user level thread stacks in the level 3 cache is configurable. However, it should be noted that the level 3 cache is optional and can be avoided for most application programs with a well-organized level 2 cache implemented as, for example, an array of lock-free linked lists or queues.

Access to the level 1 cache is uncontended given that only one particular carrier thread can access that particular level 1 cache. In other words, each respective carrier thread has a corresponding level 1 cache assigned to it. In addition, the set of user level thread stacks contained in a particular level 1 cache is associated with that particular carrier thread.

Access to the level 2 cache is contended, but non-blocking. When using an array implementation for the level 2 cache, illustrative embodiments release and allocate user level thread stacks to and from the array greedily using CAS operations on available array slots in iteration. A successful CAS operation occurs when a carrier thread allocates a user level thread stack from the array of user level thread stacks in the level 2 cache and replaces that user level thread stack with a null reference in the array. Conversely, when the carrier thread releases the user level thread stack to the array of user level thread stacks in the level 2 cache, illustrative embodiments utilize a CAS operation to replace a null reference in the array with the user level thread stack released by the carrier thread.

When using an array of lock-free linked lists or queues of user level thread stacks in the level 2 cache, illustrative embodiments uniformly distribute the user level thread stacks across the linked-lists or queues. Illustrative embodiments add and remove user level thread stacks from the array of lock-free linked lists or queues in the level 2 cache utilizing CAS operations. Utilizing an array of lock-free linked lists or queues decreases cache search times and also reduces the frequency of CAS operations while searching for user level thread stacks in the level 2 cache.

Access to the level 3 cache is contended and blocking. Illustrative embodiments utilize a synchronization structure (e.g., a mutex) to guard access to the list of user level thread stacks contained in the level 3 cache. A mutex is a binary flag used to protect a shared resource (i.e., the level 3 cache) by ensuring explicit mutual exclusion. In other words, only one carrier thread can access the level 3 cache at a time to allocate a user level thread stack for a corresponding user level thread mounted on that particular carrier thread.

When determining whether to generate a new user level thread stack for a particular user level thread, illustrative embodiments first check the carrier thread's corresponding level 1 cache for a user level thread stack that corresponds to the user level thread mounted on that carrier thread. If illustrative embodiments determine that the user level thread stack corresponding to the user level thread mounted on the carrier thread exists in the level 1 cache of the carrier thread, then illustrative embodiments instruct the carrier thread to retrieve the user level thread stack corresponding to the user level thread mounted on the carrier thread from the level 1 cache and utilize the user level thread stack to execute the user level thread. If illustrative embodiments determine that the user level thread stack corresponding to the user level thread mounted on the carrier thread does not exist in the level 1 cache of the carrier thread, then illustrative embodiments perform a search of the level 2 cache. If illustrative embodiments determine that the level 2 cache is not empty based on the search, then illustrative embodiments attempt to identify a corresponding user level thread stack for the user level thread mounted on the carrier thread by comparing and swapping a null reference into a populated slot containing a user level thread stack. If the CAS operation fails, then illustrative embodiments try to identify the next populated (i.e., non-null) slot in the array containing a user level thread stack. It should be noted that there is a configurable maximum number of retries for this CAS operation after reaching the end of the array in the level 2 cache without identifying a corresponding user level thread stack for the user level thread mounted on the carrier thread. If illustrative embodiments identify a corresponding user level thread stack for the user level thread mounted on the carrier thread in the level 2 cache, then illustrative embodiments instruct the carrier thread to retrieve and utilize that user level thread stack to execute the user level thread.

If illustrative embodiments determine that the level 2 cache is empty based on the search or if illustrative embodiments are unable to identify a corresponding user level thread stack for the user level thread mounted on the carrier thread in the level 2 cache, then illustrative embodiments perform a search of the level 3 cache in an attempt to identify a corresponding user level thread stack for the user level thread mounted on the carrier thread. If illustrative embodiments determine that the level 3 cache is not empty based on the search, then illustrative embodiments instruct the carrier thread to retrieve the corresponding user level thread stack for the user level thread mounted on the carrier thread from the level 3 cache while enforcing synchronization (e.g., explicit mutual exclusion) and utilize that user level thread stack to execute the user level thread. If illustrative embodiments determine that the level 3 cache is empty based on the search, then illustrative embodiments generate a new user level thread stack for the user level thread mounted on the carrier thread. Afterward, illustrative embodiments instruct the carrier thread to utilize the newly generated user level thread stack to execute the user level thread.

When the user level thread completes, the carrier thread releases the user level thread stack corresponding to the completed user level thread and illustrative embodiments add the released user level thread stack to the level 1 cache corresponding to that particular carrier thread in response to illustrative embodiments determining that the level 1 cache is not full. If illustrative embodiments determine that the level 1 cache is full, then illustrative embodiments search through the level 2 cache and add the released user level thread stack corresponding to the completed user level thread in a null reference slot of the level 2 cache using a CAS operation in response to illustrative embodiments determining that the level 2 cache is not full. In response to illustrative embodiments determining that both the level 1 cache and the level 2 cache are full, then illustrative embodiments determine whether the level 3 cache is less than a maximum size limit for the level 3 cache. If illustrative embodiments determine that the level 3 cache is less than the maximum size limit for the level 3 cache, then illustrative embodiments add the released user level thread stack corresponding to the completed user level thread to the level 3 cache while enforcing synchronization. If illustrative embodiments determine that the level 3 cache is greater than or equal to the maximum size limit for the level 3 cache, then illustrative embodiments free the released user level thread stack (i.e., delete the user level thread stack and release the memory space). When the carrier thread terminates, illustrative embodiments add any user level thread stacks contained in the level 1 cache corresponding to the terminated carrier thread to the level 2 cache or the level 3 cache using similar heuristics when the level 1 cache is determined to be full.

Illustrative embodiments make heuristic decisions when adding user level thread stacks to the multiple cache levels provided by illustrative embodiments. For example, illustrative embodiments monitor cache traits for each multi-threaded application running on the system. The cache traits include, for example, user level thread stack generation rate, cache hit rate, cache miss rate, number of available user level thread stacks in a cache, maximum cache size, usability rate of user level thread stacks (i.e., number of used user level thread stacks and total number of user level thread stacks) in the cache, and the like. Illustrative embodiments record the user level thread stack generation rate for a start-up phase (i.e., before main is called), a ramp-up phase (i.e., before just-in-time compilation reduces), and a steady state phase of each multithreaded application.

Illustrative embodiments persist the cache traits per multithreaded application in a Shared Classes Cache for subsequent virtual machine runs to utilize. Illustrative embodiments utilize the cache traits per multithreaded application to change the size of the different cache levels at startup to increase the cache hit rates and decrease the cache miss rates. Illustrative embodiments can also utilize the cache traits per multithreaded application to prefill one or more of the different cache levels with user level thread stacks. However, it should be noted that illustrative embodiments only prefill the level 2 cache and/or the level 3 cache with user level thread stacks because illustrative embodiments need to potentially perform the prefilling process before carrier threads are generated.

Over subsequent runs of a particular multithreaded application, illustrative embodiments learn more about the cache traits of that particular multithreaded application over time to improve the performance of the multiple cache levels. Similarly, when illustrative embodiments are monitoring CPU activity, under low CPU utilization when exclusive access is acquired, illustrative embodiments can redistribute user level thread stacks contained in the level 3 cache to the level 1 cache and the level 2 cache or can redistribute user level thread stacks contained in the level 2 cache to the level 1 cache based on heuristic decisions. An example of a heuristic decision for redistributing user level thread stacks from the level 2 cache to the level 1 cache is when the cache miss rate for the level 1 cache is greater than or equal to a maximum cache miss rate threshold level. The maximum cache miss rate threshold level can be user-defined based on cache performance testing.

Optionally, under any exclusive access (e.g., this could be included in a garbage collection stop-the-world pause, exclusive for class redefinition, or the like), user level thread stack redistribution can also occur from the level 2 cache to the level 1 cache. Optionally, the user can set a maximum cache miss rate for the level 1 cache and when the cache miss rate for the level 1 cache is greater than or equal to the maximum cache miss rate, illustrative embodiments automatically increase the size of the level 1 cache by a predefined amount. Similarly, the user can set a minimum user level thread stack usability rate and when the usability rate for one or more user level thread stacks in a cache is less than or equal to the minimum user level thread stack usability rate, illustrative embodiments decrease the number of user level thread stacks in that cache by removing those user level thread stacks that are used less than the minimum user level thread stack usability rate (i.e., essentially unused thread stacks).

Furthermore, illustrative embodiments can also apply the heuristic decisions above for batch user level thread stack population to, and evacuation from, each of the multiple cache levels, which will help with temporal imbalances. This batch user level thread stack population and evacuation will help in scenarios where there are rapid ramp-ups and rapid declines. Rapid ramp-ups are when there is an exponentially higher user level thread stack allocation rate in comparison to the user level thread stack release rate, which will lead to cache depletion of user level thread stacks. Rapid declines are when there is an exponentially higher user level thread stack release rate in comparison to the user level thread stack allocation rate, which will lead to cache overflow of user level thread stacks.

Illustrative embodiments can utilize batch user level thread stack population of the multiple cache levels during rapid ramp-ups when cache accesses are greater than a defined maximum cache access threshold level and cache miss rates are greater than a defined maximum cache miss rate threshold level. Illustrative embodiments can utilize batch user level thread stack evacuation during rapid declines when cache accesses are less than a defined minimum cache access threshold level and cache miss rates are less than a defined minimum cache miss rate threshold level. Illustrative embodiments can implement these batch population and evacuation processes either asynchronously (e.g., by an explicit background thread (i.e., not a user level thread) that only interacts with the caches and is internal to the virtual machine or during garbage collection stop-the-world pauses) or synchronously (i.e., during user level thread stack allocation in the context of carrier threads). Potential issues with the asynchronous approach are, for example: 1) if performed during garbage collection stop-the-world pauses, then application user level threads are prevented from performing activities for the duration of the batch population process; and 2) if performed by an explicit background thread, increased thread contention can be introduced. Illustrative embodiments can mitigate the second issue of the asynchronous approach utilizing a non-blocking try-acquire process. Thus, batch cache population and evacuation are useful with dynamic cache level resizing.

Thus, illustrative embodiments provide one or more technical solutions that overcome a technical problem with an inability of existing solutions to provide multiple level caching of user level thread stacks for user level threads. As a result, these one or more technical solutions provide a technical effect and practical application in the field of multithreading by increasing thread performance using multiple level caching of user level thread stacks for user level threads.

With reference now to FIG. 2, a diagram illustrating an example of a stack caching system is depicted in accordance with an illustrative embodiment. Stack caching system 201 may be implemented in a computing environment, such as computing environment 100 in FIG. 1. Stack caching system 201 is a system of hardware and software components for multiple level caching of user level thread stacks for user level threads.

In this example, stack caching system 201 includes computer 202 and client device 203. Computer 202 and client device 203 may be, for example, computer 101 and EUD 103 in FIG. 1. However, it should be noted that stack caching system 201 is intended as an example only and not as a limitation on illustrative embodiments. For example, stack caching system 201 can include any number of computers and client devices, along with other devices and components not shown.

Computer 202 includes operating system 204, processor set 206, and memory 208, such as, for example, operating system 122, processor set 110, and volatile memory 112 in FIG. 1. Operating system 204 includes kernel space 210 and user space 212. User space 212 includes multithreaded application 214.

Multithreaded application 214 can represent any type of multithreaded application. In addition, multithreaded application 214 can perform a set of services to requesting client device users (e.g., customers). The set of services can be any type of services, such as, for example, banking services, financial services, healthcare services, educational services, governmental services, insurance services, entertainment services, or the like. Multithread application 214 performs a plurality of tasks corresponding to the set of services provided by multithreaded application 214.

A user of client device 203 sends request 215 for performance of a task related to the set of services provided by multithreaded application 214. The task associated with request 215 may be, for example, to retrieve a previous bank statement, view an insurance policy, add a medical record, edit a form, or the like. Multithreaded application 214 utilizes user level thread 216 to perform the requested task. It should be noted that user level thread 216 represents one of a plurality of user level threads corresponding to multithreaded application 214. Each of the plurality of user level threads performs a different task corresponding to the set of services provided by multithreaded application 214.

Computer 202 utilizes processor set 206 to execute user level thread 216 to perform the requested task. Computer 202 mounts user level thread 216 on carrier thread 218. It should be noted that carrier thread 218 is one of a plurality of carrier threads in kernel space 210. Then, computer 202 searches level 1 cache 222, level 2 cache 224, and level 3 cache 226 located in memory 208 for user level thread stack 220, which corresponds to user level thread 216. However, it should be noted that level 3 cache 226 is an optional cache level. Also, it should be noted that level 2 cache 224 contains array of lock-free linked lists 228. Further, it should be noted that level 2 cache 224 may be located in NUMA node 230. NUMA node 230 represents a plurality of NUMA nodes located in memory 208. In addition, each respective NUMA node of the plurality of NUMA nodes can contain a level 2 cache, such as level 2 cache 224.

In response to computer 202 locating user level thread stack 220 in one of level 1 cache 222, level 2 cache 224, or level 3 cache 226, computer 202 retrieves user level thread stack 220 from that particular cache level and utilizes user level thread stack 220 to execute user level thread 216 mounted on carrier thread 218 to perform the requested task. In response to computer 202 not locating user level thread stack 220 in one of level 1 cache 222, level 2 cache 224, or level 3 cache 226, computer 202 generates user level thread stack 220 and utilizes newly generated user level thread stack 220 to execute user level thread 216 mounted on carrier thread 218 to perform the requested task.

Figure 3A:
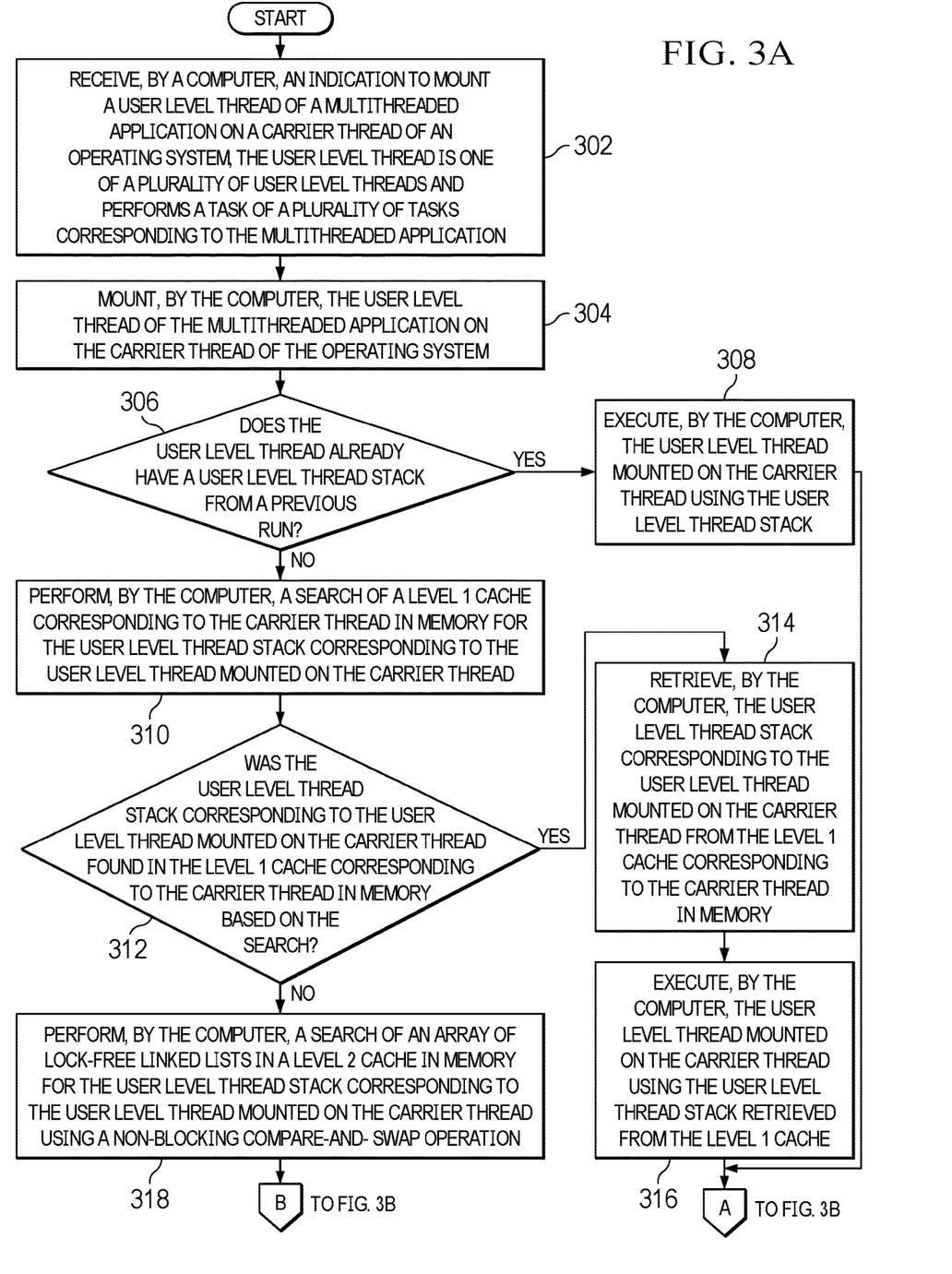
FIGS. 3A-3B are a flowchart illustrating a process for executing threads using cached stacks in accordance with an illustrative embodiment.
Figure 3B:
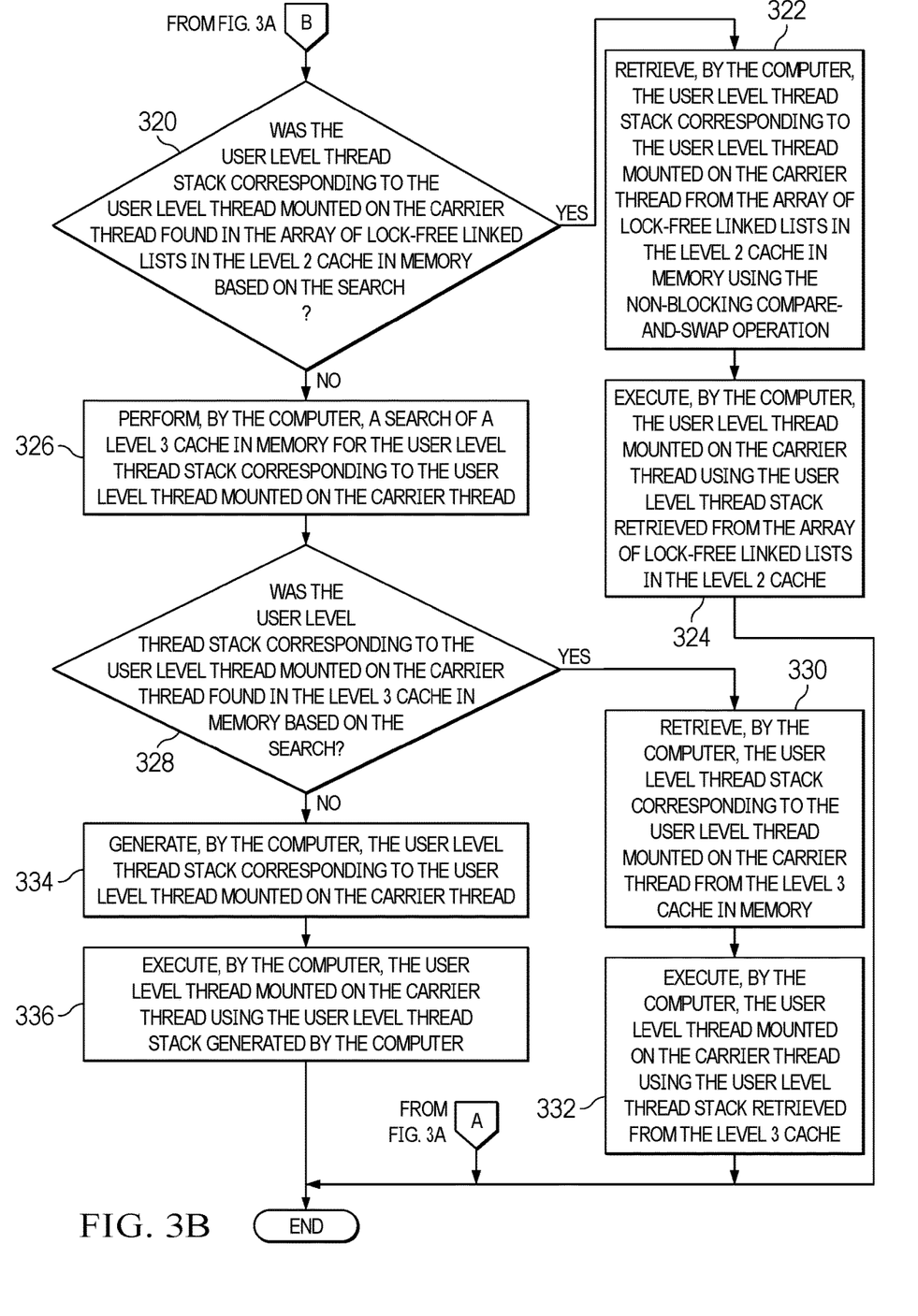

With reference now to FIGS. 3A-3B, a flowchart illustrating a process for executing threads using cached stacks is shown in accordance with an illustrative embodiment. The process shown in FIGS. 3A-3B may be implemented in a computer, such as, for example, computer 101 in FIG. 1 or computer 202 in FIG. 2. For example, the process shown in FIGS. 3A-3B may be implemented in stack caching code 200 in FIG. 1.

The process begins when the computer receives an indication to mount a user level thread of a multithreaded application on a carrier thread of an operating system (step 302). The user level thread is one of a plurality of user level threads and performs a task of a plurality of tasks corresponding to the multithreaded application. In response to receiving the indication, the computer mounts the user level thread of the multithreaded application on the carrier thread of the operating system (step 304).

The computer makes a determination as to whether the user level thread already has a user level thread stack from a previous run (step 306). If the computer determines that the user level thread does already have a user level thread stack from a previous run, yes output of step 306, then the computer executes the user level thread mounted on the carrier thread using the user level thread stack (step 308). Thereafter, the process terminates.

If the computer determines that the user level thread does not already have a user level thread stack from a previous run, no output of step 306, then the computer performs a search of a level 1 cache corresponding to the carrier thread in memory for the user level thread stack corresponding to the user level thread mounted on the carrier thread (step 310). The computer makes a determination as to whether the user level thread stack corresponding to the user level thread mounted on the carrier thread was found in the level 1 cache corresponding to the carrier thread in memory based on the search of the level 1 cache (step 312).

If the computer determines that the user level thread stack corresponding to the user level thread mounted on the carrier thread was found in the level 1 cache corresponding to the carrier thread in memory based on the search of the level 1 cache, yes output of step 312, then the computer retrieves the user level thread stack corresponding to the user level thread mounted on the carrier thread from the level 1 cache corresponding to the carrier thread in memory (step 314). The computer executes the user level thread mounted on the carrier thread using the user level thread stack retrieved from the level 1 cache (step 316). Thereafter, the process terminates.

If the computer determines that the user level thread stack corresponding to the user level thread mounted on the carrier thread was not found in the level 1 cache corresponding to the carrier thread in memory based on the search of the level 1 cache, no output of step 312, then the computer performs a search of an array of lock-free linked lists in a level 2 cache in memory for the user level thread stack corresponding to the user level thread mounted on the carrier thread using a non-blocking compare-and-swap operation (step 318). The computer makes a determination as to whether the user level thread stack corresponding to the user level thread mounted on the carrier thread was found in the array of lock-free linked lists in the level 2 cache in memory based on the search of the array (step 320).

If the computer determines that the user level thread stack corresponding to the user level thread mounted on the carrier thread was found in the array of lock-free linked lists in the level 2 cache in memory based on the search of the array, yes output of step 320, then the computer retrieves the user level thread stack corresponding to the user level thread mounted on the carrier thread from the array of lock-free linked lists in the level 2 cache in memory using the non-blocking compare-and-swap operation (step 322). The computer executes the user level thread mounted on the carrier thread using the user level thread stack retrieved from the array of lock-free linked lists in the level 2 cache (step 324). Thereafter, the process terminates.

If the computer determines that the user level thread stack corresponding to the user level thread mounted on the carrier thread was not found in the array of lock-free linked lists in the level 2 cache in memory based on the search of the array, no output of step 320, then the computer performs a search of a level 3 cache in memory for the user level thread stack corresponding to the user level thread mounted on the carrier thread (step 326). The computer makes a determination as to whether the user level thread stack corresponding to the user level thread mounted on the carrier thread was found in the level 3 cache in memory based on the search of the level 3 cache (step 328).

If the computer determines that the user level thread stack corresponding to the user level thread mounted on the carrier thread was found in the level 3 cache in memory based on the search of the level 3 cache, yes output of step 328, then the computer retrieves the user level thread stack corresponding to the user level thread mounted on the carrier thread from the level 3 cache in memory (step 330). The computer executes the user level thread mounted on the carrier thread using the user level thread stack retrieved from the level 3 cache (step 332). Thereafter, the process terminates.

If the computer determines that the user level thread stack corresponding to the user level thread mounted on the carrier thread was not found in the level 3 cache in memory based on the search of the level 3 cache, no output of step 328, then the computer generates the user level thread stack corresponding to the user level thread mounted on the carrier thread (step 334). The computer executes the user level thread mounted on the carrier thread using the user level thread stack generated by the computer (step 336). Thereafter, the process terminates.

Figure 4:
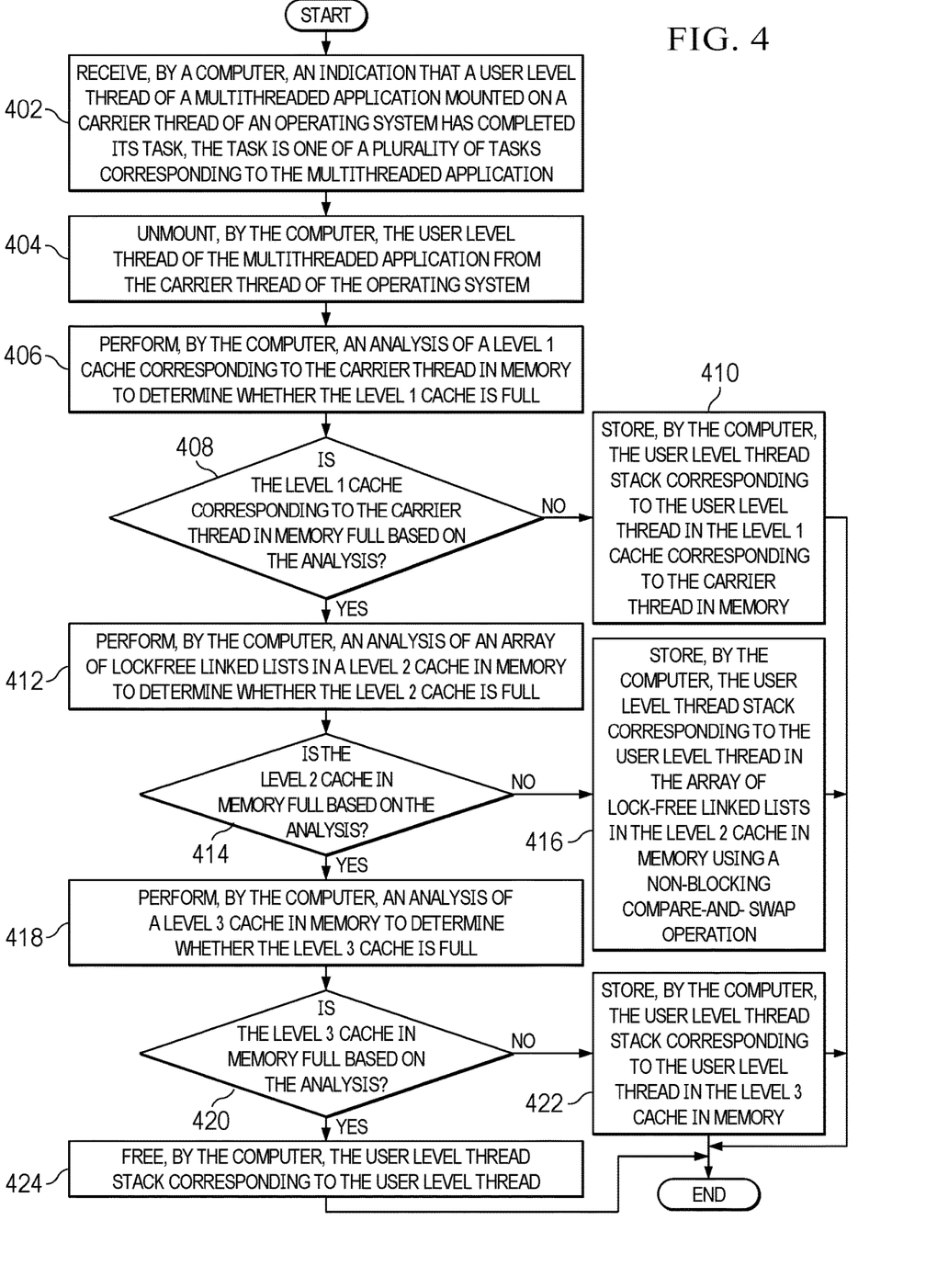
FIG. 4 is a flowchart illustrating a process for multiple level stack caching in accordance with an illustrative embodiment.

With reference now to FIG. 4, a flowchart illustrating a process for multiple level stack caching is shown in accordance with an illustrative embodiment. The process shown in FIG. 4 may be implemented in a computer, such as, for example, computer 101 in FIG. 1 or computer 202 in FIG. 2. For example, the process shown in FIG. 4 may be implemented in stack caching code 200 in FIG. 1.

The process begins when the computer receives an indication that a user level thread of a multithreaded application mounted on a carrier thread of an operating system has completed its task (step 402). The task is one of a plurality of tasks corresponding to the multithreaded application. In response to receiving the indication, the computer unmounts the user level thread of the multithreaded application from the carrier thread of the operating system (step 404). The computer performs an analysis of a level 1 cache corresponding to the carrier thread in memory to determine whether the level 1 cache is full (step 406).

The computer makes a determination as to whether the level 1 cache corresponding to the carrier thread in memory is full based on the analysis of the level 1 cache (step 408). If the computer determines that the level 1 cache corresponding to the carrier thread in memory is not full based on the analysis of the level 1 cache, no output step 408, then the computer stores the user level thread stack corresponding to the user level thread in the level 1 cache corresponding to the carrier thread in memory (step 410). Thereafter, the process terminates.

If the computer determines that the level 1 cache corresponding to the carrier thread in memory is full based on the analysis of the level 1 cache, yes output step 408, then the computer performs an analysis of an array of lock-free linked lists in a level 2 cache in memory to determine whether the level 2 cache is full (step 412). The computer makes a determination as to whether the level 2 cache in memory is full based on the analysis of the array (step 414).

If the computer determines that the level 2 cache in memory is not full based on the analysis of the array, no output of step 414, then the computer stores the user level thread stack corresponding to the user level thread in the array of lock-free linked lists in the level 2 cache in memory using a non-blocking compare-and-swap operation (step 416). Thereafter, the process terminates.

If the computer determines that the level 2 cache in memory is full based on the analysis of the array, yes output of step 414, then the computer performs an analysis of a level 3 cache in memory to determine whether the level 3 cache is full (step 418). The computer makes a determination as to whether the level 3 cache in memory is full based on the analysis of the level 3 cache (step 420).

If the computer determines that the level 3 cache in memory is not full based on the analysis of the level 3 cache, no output of step 420, then the computer stores the user level thread stack corresponding to the user level thread in the level 3 cache in memory (step 422). Thereafter, the process terminates.

If the computer determines that the level 3 cache in memory is full based on the analysis of the level 3 cache, yes output of step 420, then the computer frees the user level thread stack corresponding to the user level thread (step 424). Thereafter, the process terminates.

Figure 5:
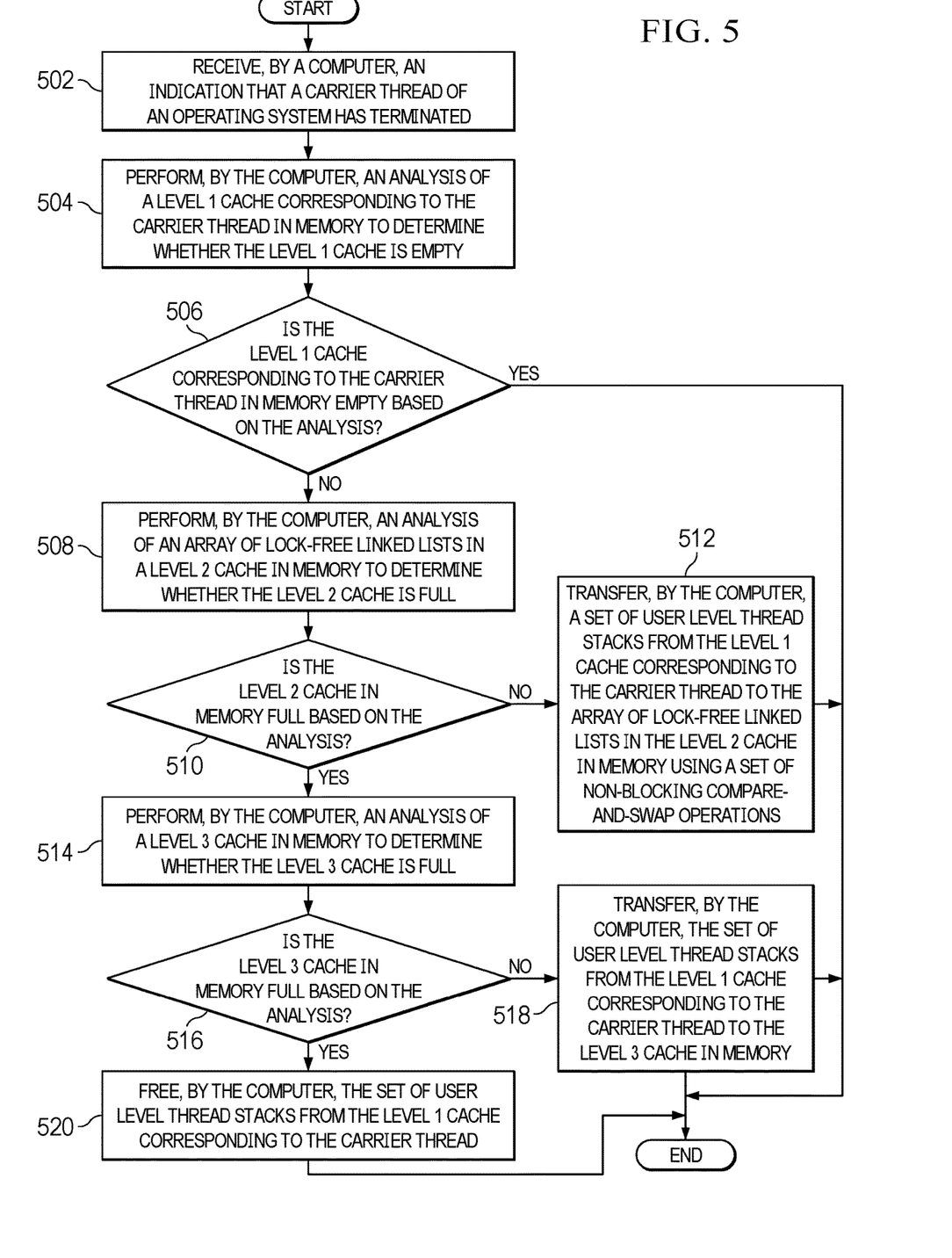
FIG. 5 is a flowchart illustrating a process for transferring stacks to different cache levels in accordance with an illustrative embodiment.

With reference now to FIG. 5, a flowchart illustrating a process for transferring stacks to different cache levels is shown in accordance with an illustrative embodiment. The process shown in FIG. 5 may be implemented in a computer, such as, for example, computer 101 in FIG. 1 or computer 202 in FIG. 2. For example, the process shown in FIG. 5 may be implemented in stack caching code 200 in FIG. 1.

The process begins when the computer receives an indication that a carrier thread of an operating system has terminated (step 502). In response to receiving the indication, the computer performs an analysis of a level 1 cache corresponding to the carrier thread in memory to determine whether the level 1 cache is empty (step 504). The computer makes a determination as to whether the level 1 cache corresponding to the carrier thread in memory is empty based on the analysis of the level 1 cache (step 506).

If the computer determines that the level 1 cache corresponding to the carrier thread in memory is empty based on the analysis of the level 1 cache, yes output of step 506, then the process terminates. If the computer determines that the level 1 cache corresponding to the carrier thread in memory is not empty based on the analysis of the level 1 cache, no output of step 506, then the computer performs an analysis of an array of lock-free linked lists in a level 2 cache in memory to determine whether the level 2 cache is full (step 508).

The computer makes a determination as to whether the level 2 cache in memory is full based on the analysis of the array (step 510). If the computer determines that the level 2 cache in memory is not full based on the analysis of the array, no output of step 510, then the computer transfers a set of user level thread stacks from the level 1 cache corresponding to the carrier thread to the array of lock-free linked lists in the level 2 cache in memory using a set of non-blocking compare-and-swap operations (step 512). Thereafter, the process terminates.

If the computer determines that the level 2 cache in memory is full based on the analysis of the array, yes output of step 510, then the computer performs an analysis of a level 3 cache in memory to determine whether the level 3 cache is full (step 514). The computer makes a determination as to whether the level 3 cache in memory is full based on the analysis of the level 3 cache (step 516).

If the computer determines that the level 3 cache in memory is not full based on the analysis of the level 3 cache, no output of step 516, then the computer transfers the set of user level thread stacks from the level 1 cache corresponding to the carrier thread to the level 3 cache in memory (step 518). Thereafter, the process terminates.

If the computer determines that the level 3 cache in memory is full based on the analysis of the level 3 cache, yes output of step 516, then the computer frees the set of user level thread stacks from the level 1 cache corresponding to the carrier thread (step 520). Thereafter, the process terminates.

Thus, illustrative embodiments of the present disclosure provide a computer-implemented method, computer system, and computer program product for multiple level caching of user level thread stacks for user level threads. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for multiple level stack caching, the computer-implemented method comprising:
   unmounting, by a computer, a user level thread of a multithreaded application from a carrier thread of an operating system;
   performing, by the computer, an analysis of a level 1 cache corresponding to the carrier thread in memory to determine whether the level 1 cache is full;
   performing, by the computer, an analysis of a level 2 cache in memory to determine whether the level 2 cache is full in response to the computer determining that the level 1 cache corresponding to the carrier thread in memory is full; and
   storing, by the computer, a user level thread stack corresponding to the user level thread in the level 2 cache in memory in response to the computer determining that the level 2 cache in memory is not full.

2. The computer-implemented method of claim 1, further comprising:
   performing, by the computer, an analysis of a level 3 cache in memory to determine whether the level 3 cache is full in response to the computer determining that the level 2 cache in memory is full; and
   storing, by the computer, the user level thread stack corresponding to the user level thread in the level 3 cache in memory in response to the computer determining that the level 3 cache in memory is not full.

3. The computer-implemented method of claim 2, further comprising:
   freeing, by the computer, the user level thread stack corresponding to the user level thread in response to the computer determining that the level 3 cache in memory is full.

4. The computer-implemented method of claim 1, further comprising:
   storing, by the computer, the user level thread stack corresponding to the user level thread in the level 1 cache corresponding to the carrier thread in memory in response to the computer determining that the level 1 cache corresponding to the carrier thread in memory is not full.

5. The computer-implemented method of claim 1, further comprising:
   performing, by the computer, the analysis of the level 1 cache corresponding to the carrier thread in memory to determine whether the level 1 cache is empty in response to receiving an indication that the carrier thread of the operating system has terminated;
   performing, by the computer, the analysis of the level 2 cache in memory to determine whether the level 2 cache is full in response to the computer determining that the level 1 cache corresponding to the carrier thread in memory is not empty; and
   transferring, by the computer, a set of user level thread stacks from the level 1 cache corresponding to the carrier thread to the level 2 cache in memory.

6. The computer-implemented method of claim 5, further comprising:
   performing, by the computer, an analysis of a level 3 cache in memory to determine whether the level 3 cache is full; and
   transferring, by the computer, the set of user level thread stacks from the level 1 cache corresponding to the carrier thread to the level 3 cache in memory in response to the computer determining that the level 3 cache in memory is not full.

7. The computer-implemented method of claim 6, further comprising:
   freeing, by the computer, the set of user level thread stacks from the level 1 cache corresponding to the carrier thread in response to the computer determining that the level 3 cache in memory is full.

8. The computer-implemented method of claim 1, further comprising:
   mounting, by the computer, the user level thread of the multithreaded application on the carrier thread of the operating system;
   determining, by the computer, whether the user level thread already has the user level thread stack from a previous run;
   performing, by the computer, a search of the level 1 cache corresponding to the carrier thread in memory for the user level thread stack corresponding to the user level thread mounted on the carrier thread in response to the computer determining that the user level thread does not already have the user level thread stack from the previous run;
   determining, by the computer, whether the user level thread stack corresponding to the user level thread mounted on the carrier thread was found in the level 1 cache corresponding to the carrier thread in memory based on the search of the level 1 cache;
   retrieving, by the computer, the user level thread stack corresponding to the user level thread mounted on the carrier thread from the level 1 cache corresponding to the carrier thread in memory in response to the computer determining that the user level thread stack corresponding to the user level thread mounted on the carrier thread was found in the level 1 cache corresponding to the carrier thread in memory based on the search of the level 1 cache; and
   executing, by the computer, the user level thread mounted on the carrier thread using the user level thread stack retrieved from the level 1 cache.

9. The computer-implemented method of claim 8, further comprising:
   performing, by the computer, a search of the level 2 cache in memory for the user level thread stack corresponding to the user level thread mounted on the carrier thread in response to the computer determining that the user level thread stack corresponding to the user level thread mounted on the carrier thread was not found in the level 1 cache corresponding to the carrier thread in memory based on the search of the level 1 cache;

determining, by the computer, whether the user level thread stack corresponding to the user level thread mounted on the carrier thread was found in the level 2 cache in memory based on the search of the level 2 cache;

retrieving, by the computer, the user level thread stack corresponding to the user level thread mounted on the carrier thread from the level 2 cache in memory in response to the computer determining that the user level thread stack corresponding to the user level thread mounted on the carrier thread was found in the level 2 cache in memory based on the search of the level 2 cache; and executing, by the computer, the user level thread mounted on the carrier thread using the user level thread stack retrieved from the level 2 cache.

10. The computer-implemented method of claim 9, further comprising:

performing, by the computer, a search of a level 3 cache in memory for the user level thread stack corresponding to the user level thread mounted on the carrier thread in response to the computer determining that the user level thread stack corresponding to the user level thread mounted on the carrier thread was not found in the level 2 cache in memory based on the search of the level 2 cache;

determining, by the computer, whether the user level thread stack corresponding to the user level thread mounted on the carrier thread was found in the level 3 cache in memory based on the search of the level 3 cache;

retrieving, by the computer, the user level thread stack corresponding to the user level thread mounted on the carrier thread from the level 3 cache in memory in response to the computer determining that the user level thread stack corresponding to the user level thread mounted on the carrier thread was found in the level 3 cache in memory based on the search of the level 3 cache; and executing, by the computer, the user level thread mounted on the carrier thread using the user level thread stack retrieved from the level 3 cache.

11. The computer-implemented method of claim 10, further comprising:

generating, by the computer, the user level thread stack corresponding to the user level thread mounted on the carrier thread in response to the computer determining that the user level thread stack corresponding to the user level thread mounted on the carrier thread was not found in the level 3 cache in memory based on the search of the level 3 cache; and executing, by the computer, the user level thread mounted on the carrier thread using the user level thread stack generated by the computer.

12. The computer-implemented method of claim 1, wherein the level 2 cache includes an array of lock-free linked lists, and wherein the computer stores the user level thread stack corresponding to the user level thread in the array of lock-free linked lists in the level 2 cache in memory using a non-blocking compare-and-swap operation.

13. A computer system for multiple level stack caching, the computer system comprising:

a communication fabric;

a storage device connected to the communication fabric, wherein the storage device stores program instructions; and a processor connected to the communication fabric, wherein the processor executes the program instructions to:

unmount a user level thread of a multithreaded application from a carrier thread of an operating system;

perform an analysis of a level 1 cache corresponding to the carrier thread in memory to determine whether the level 1 cache is full;

perform an analysis of a level 2 cache in memory to determine whether the level 2 cache is full in response to determining that the level 1 cache corresponding to the carrier thread in memory is full; and store a user level thread stack corresponding to the user level thread in the level 2 cache in memory in response to determining that the level 2 cache in memory is not full.

14. The computer system of claim 13, wherein the processor further executes the program instructions to:

perform an analysis of a level 3 cache in memory to determine whether the level 3 cache is full in response to determining that the level 2 cache in memory is full; and store the user level thread stack corresponding to the user level thread in the level 3 cache in memory in response to determining that the level 3 cache in memory is not full.

15. The computer system of claim 14, wherein the processor further executes the program instructions to:

free the user level thread stack corresponding to the user level thread in response to determining that the level 3 cache in memory is full.

16. The computer system of claim 13, wherein the processor further executes the program instructions to:

store the user level thread stack corresponding to the user level thread in the level 1 cache corresponding to the carrier thread in memory in response to determining that the level 1 cache corresponding to the carrier thread in memory is not full.

17. A computer program product for multiple level stack caching, the computer program product comprising a computer-readable storage medium having program instructions embodied therewith, the program instructions executable by a computer to cause the computer to:

unmount a user level thread of a multithreaded application from a carrier thread of an operating system;

perform an analysis of a level 1 cache corresponding to the carrier thread in memory to determine whether the level 1 cache is full;

perform an analysis of a level 2 cache in memory to determine whether the level 2 cache is full in response to determining that the level 1 cache corresponding to the carrier thread in memory is full; and store a user level thread stack corresponding to the user level thread in the level 2 cache in memory in response to determining that the level 2 cache in memory is not full.

18. The computer program product of claim 17, wherein the program instructions further cause the computer to:

perform an analysis of a level 3 cache in memory to determine whether the level 3 cache is full in response to determining that the level 2 cache in memory is full; and store the user level thread stack corresponding to the user level thread in the level 3 cache in memory in response to determining that the level 3 cache in memory is not full.

19. The computer program product of claim 18, wherein the program instructions further cause the computer to:
free the user level thread stack corresponding to the user level thread in response to determining that the level 3 cache in memory is full.

20. The computer program product of claim 17, wherein the program instructions further cause the computer to:
store the user level thread stack corresponding to the user level thread in the level 1 cache corresponding to the carrier thread in memory in response to determining that the level 1 cache corresponding to the carrier thread in memory is not full.

\* \* \* \* \*